(No Model.) 2 Sheets—Sheet 1.

E. M. BENTLEY.
ELECTRICAL AGRICULTURAL SYSTEM.

No. 382,941. Patented May 15, 1888.

WITNESSES,
Robt. W. Blackwell.
N. W. Clark.

INVENTOR,
Edward M. Bentley
by Bentley & Knight,
Attys.

(No Model.) 2 Sheets—Sheet 2.
E. M. BENTLEY.
ELECTRICAL AGRICULTURAL SYSTEM.
No. 382,941. Patented May 15, 1888.
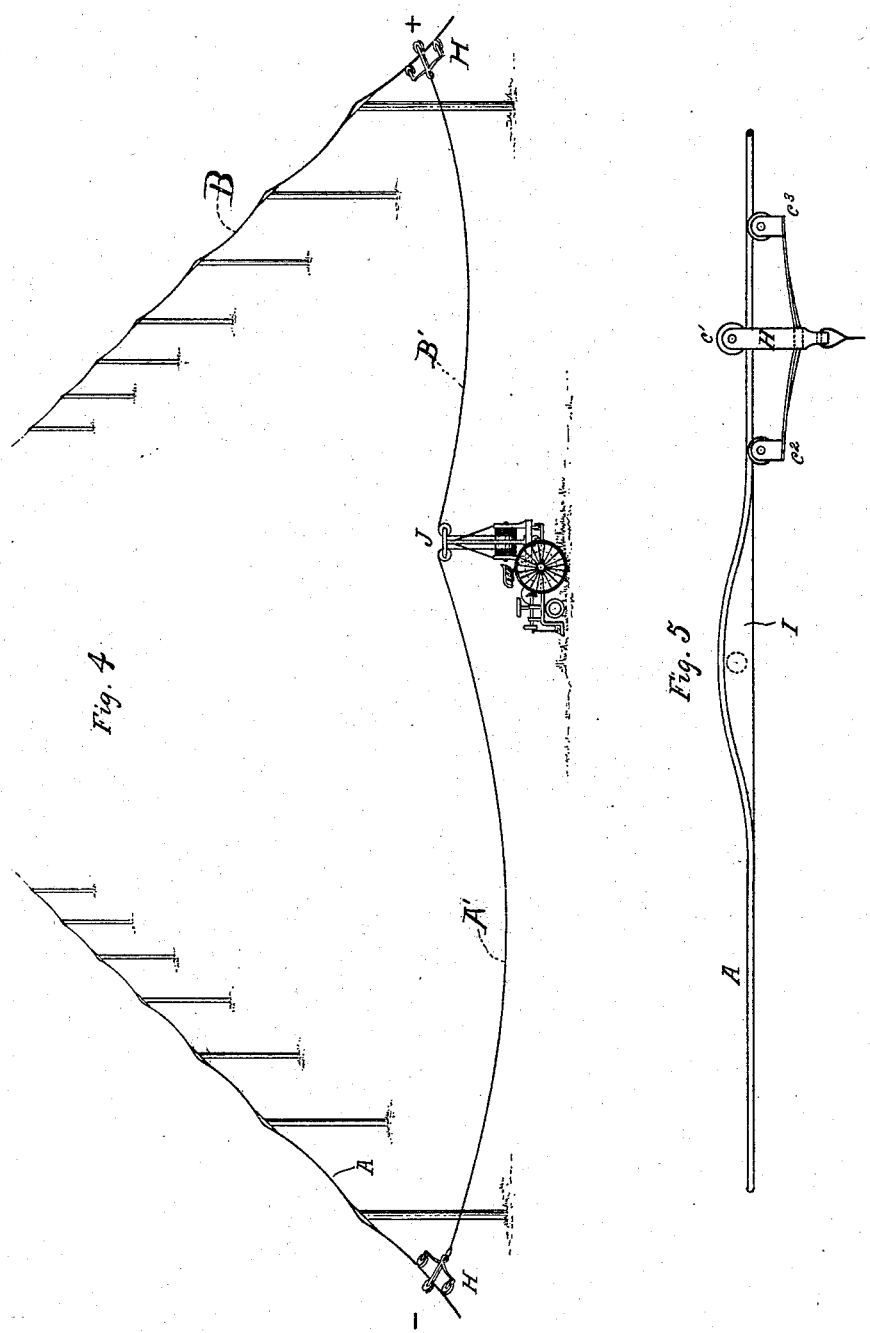
WITNESSES.
Robt W. Blackwell
R. W. Clark
INVENTOR.
Edward M. Bentley
by Bentley & Knight
Attys.

UNITED STATES PATENT OFFICE.

EDWARD M. BENTLEY, OF NEW YORK, N. Y.

ELECTRICAL AGRICULTURAL SYSTEM.

SPECIFICATION forming part of Letters Patent No. 382,941, dated May 15, 1888.

Original application filed December 11, 1885, Serial No. 185,411. Divided and this application filed November 25, 1887. Serial No. 256,031. (No model.)

*To all whom it may concern:*

Be it known that I, EDWARD M. BENTLEY, a citizen of the United States, residing at New York, in the county of New York, State of New York, have invented certain new and useful Improvements in Electrical Agricultural Systems, of which the following is a specification.

My invention relates to a system of supplying electricity from a central station to a movable electric motor adapted to reach any part of a field or district, and it is especially applicable to agricultural purposes where a harvesting-machine or other agricultural implement is to be propelled by a motor over a certain area of ground. It is evident that such a machine must have both a longitudinal and a transverse movement and still maintain its connection with the source of current-supply.

My invention, therefore, consists in suspending a line of conductors along one side of the field or district and providing a secondary conductor having a length equal to the transverse dimension of the field, which has a traveling contact on the main line, and with which the moving motor is in constant connection.

My invention is more fully described in the following specification, which is a division of my application Serial No. 185,411, filed December 11, 1885, reference being made to the accompanying drawings, in which—

Figure 1:
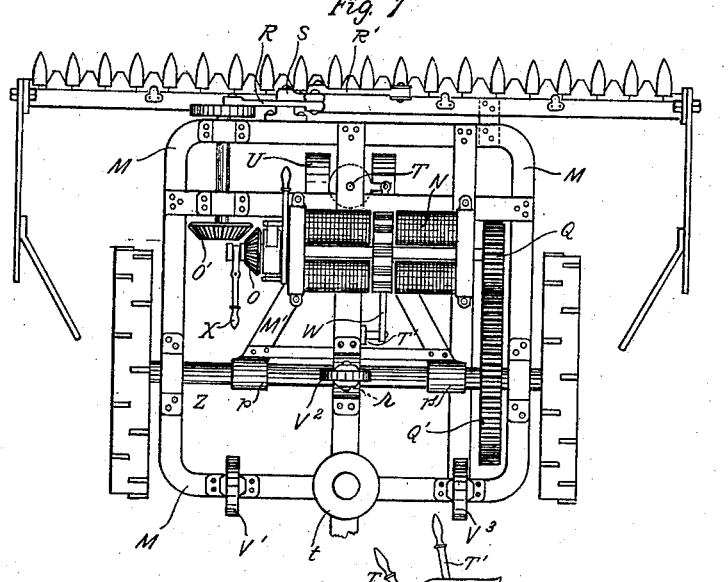
Figure 2:
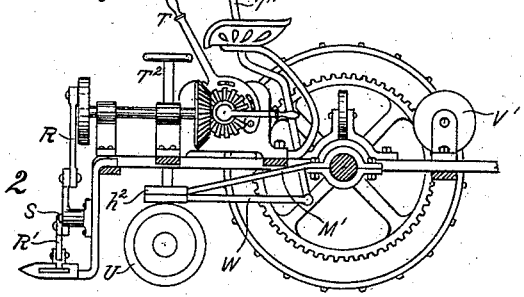
Figure 3:
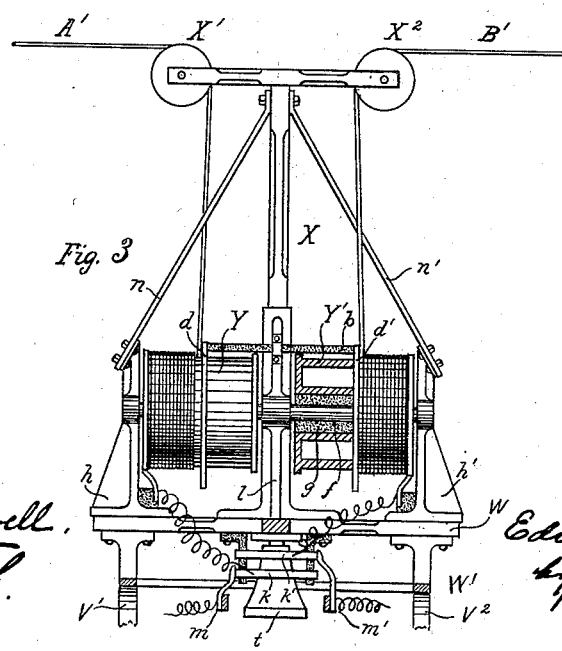

Figure 1 is a plan of an electrically-propelled mowing-machine. Fig. 2 is a side elevation of the same, partly in section. Fig. 3 is an elevation, partly in section, of the winding-drums.
Fig. 4 is a perspective of a field with a machine in operation, and Fig. 5 is a detail of a contact-trolley.

A and B, Fig. 4, are two bare wires or cables hung on poles along the opposite sides of a field, and connected with the positive and negative poles of the source of current. Upon each cable a contact-trolley, H, is adapted to travel. This trolley is constructed, as shown in Fig. 5, of the three grooved pulleys $c'$ $c^2$ $c^3$, held against the cable by spring-pressure, the springs having sufficient range to allow the trolley to pass over the enlargements formed by the yokes I on top of the poles which hold the cable in place. The cable being on top of the poles, it may be used for the adjacent fields on each side. From each trolley a wire or cable, A' and B', extends to a vehicle, J, adapted to travel back and forth across the field. I have shown for illustration a mowing-machine thus actuated by the current from A' and B'; but a plow, a rake, or other agricultural machine may be operated in a similar manner.

In Fig. 1, M is the frame of a mowing-machine, which is supported by two bearings on the axle Z and at the swiveling center $r$.

M' is a subordinate triangular frame, the base of the triangle being connected with the axle Z by boxes $p$ $p'$, while at the apex is the turn-table $h^2$, which rests on a corresponding seat on the swiveling truck U. The height of the main frame M relative to frame M' is adjustable by means of screw $T^2$, by which the cutting-bar may be raised or lowered, and the truck U may be turned in either direction by means of the steering-lever T'.

N is an electric-motor geared intermediately between the driving-wheels and the reciprocating cutting-bar by means of the spur-gearing Q Q' and the bevel-gearing O O'.
On the shaft of O' is a crank-wheel operating the pitman-rod R, connected to one arm of bell-crank lever S, the other arm being connected by rod R' to the reciprocating knives. The bevel-wheels may be thrown out of gear, if desired, and the motor employed only for propelling the vehicle, the cutting-bar being also removed if it is necessary.

T is a lever controlling the motor by means of the commutator-brushes.

In Fig. 3, $w$ is a platform pivoted like a turn-table in standard $t$ on the back of the machine and having a circular rail, $w'$, resting on friction-wheels V' $V^2$ $V^3$. Upon $w$ are three uprights, $h$, $h'$, and $l$, which afford bearings for shaft $f$, upon which are the two drums Y and Y', insulated by the wooden bushing $g$. A wooden post, X, is set in a socket on the end of $l$ and carries at the top an insulating cross-arm on which are the two grooved pulleys X' and $X^2$. $n$ and $n'$ are braces.

The two conductors A' and B' come from the two contact-trolleys as described, and, passing over the pulleys X' $X^2$, are wound in opposite directions upon the drums Y and Y', respectively. By this arrangement one wire is wound up and the other unwound as the machine progresses, d and d' being two guiding-rings moving together by means of the insulating-bar b, so as to cause the wire to be laid on regularly on both drums. The wires on the two drums are connected by suitable contact-springs to the insulated rings k and k', respectively, and by the springs m and m' bearing on these rings the current is led to the motor. By means of this rotating tower or standard the electrical connection with the motor is always maintained, while the machine can turn directly around or take any direction of movement between the two pole-lines A' and B'. No insulated wire is required, and the following wire may drag on the ground without interfering with the operation of the motor.

I claim—

1. In an electrical system for supplying current from a stationary source to a movable translating device, the combination, with an electrically-propelled vehicle, of a main line extending transversely to the course of movement of said vehicle and an intermediate conductor provided with a rotative connection permitting movement of the vehicle about a central point.

2. In an electrical system for supplying current from a stationary source to a movable translating device, the combination, with a main supply-line, of an electrically-propelled vehicle, means for guiding the vehicle at will, a winding-drum, and a conductor between the main line and the vehicle adapted to be wound on said drum and provided with a rotative connection permitting movement of the vehicle about a center.

3. In an electrical system for supplying current from a stationary source to a movable translating device, the combination, with an exposed main line, of an electric motor, means for guiding the same at will, a winding-drum, and an intermediate conductor between the motor and the main line adapted to be wound on said drum and having a traveling connection with said main line.

4. In an electrical system for supplying current from a stationary source to a movable translating device, the combination of an exposed main line extending along one side of a field or district, a conductor having a traveling connection therewith and equal in length to the transverse dimension of said field or district, a movable electric motor adapted to follow said conductor, and means for guiding said motor at will.

5. The combination, with a main supply-line, of a bare conductor having at one end a traveling connection with said line, an insulated drum upon which said conductor is adapted to be wound, and a movable electrical translating device on the opposite end of said conductor.

6. In an electrical agricultural system, the combination, with a main-line wire extending along one side of a field, of an electrically-propelled machine having an extensible connection therewith, permitting a transverse movement of the machine relatively to the wire.

7. In an electrical agricultural system, the combination of a main supply-line, an electrically-propelled vehicle having a traveling connection with said line, a propelling-motor for the vehicle, and mechanism on the vehicle actuated thereby.

8. In an electrical agricultural system, the combination, with a main supply-line, of an electrically-propelled vehicle having a movement to and from said line and provided with a rotative electrical connection therewith, whereby it may turn about a central point.

9. In an electrical agricultural system, the combination of the main supply-conductor, a bare secondary conductor having a traveling connection with the main, an insulated drum for said secondary conductor, an electrically-propelled vehicle having a rotative connection with the main through the secondary, and means for guiding said vehicle at will.

10. In an electrical agricultural system, the combination of a main supply-line extending along one side of a field or district, a bare secondary supply-conductor having a length equal to the transverse dimension of said field or district and a traveling connection with said main line, an electrically-propelled vehicle, means for guiding the same at will, and an insulated drum on said vehicle, on which the secondary conductor is adapted to be wound.

11. In an electrical agricultural system, the combination of a main supply-conductor, a secondary conductor having a traveling connection therewith, an electrically-propelled vehicle, means for guiding the same at will, a drum on the vehicle for the secondary conductor, and a standard over which said conductor passes in reaching said drum.

12. In an electrical agricultural system, the combination, with a main line extending along one side of a field or district and suspended from the tops of a line of posts, of a transverse conductor having a traveling connection therewith and of a length equal to the transverse dimension of the field or district, an electrically-propelled vehicle in constant connection with said conductor, and means for guiding the same at will.

13. The combination, with a main supply-conductor extending along one side of a field or district, a corresponding line on the opposite side, a transverse conductor having a traveling connection at each end, and a movable electric motor having a connection with said transverse conductor.

14. The combination of the positive and negative supply-lines on opposite sides of a field or district, respectively, a transverse conductor having a traveling connection with said lines at its opposite ends, and a movable electric motor included in the circuit of said conductor.

15. The combination of the positive and negative lines on opposite sides of a field or district, respectively, two parallel wires having a length equal to the transverse dimension of the field or district and a traveling connection with the said lines, respectively, and a movable electric motor in circuit between said wires.

16. In an electrically-propelled harvesting-machine, the combination, with a propelling-motor, of a stationary conductor with which the motor has a traveling rotative connection permitting movement of the machine about a center, means for guiding the machine at will, and a cutting-bar extending transversely in front of the machine.

17. The combination, with a movable electric translating device, of a stationary source of current, an intermediate conductor, a winding-drum therefor, and a traveling guide for directing the conductor on the drum.

18. The combination, with a movable electric motor, of a stationary source of current, a movable electric translating device, two intermediate conductors extending from opposite directions, and a winding-drum upon which said conductors are oppositely wound, so that one may wind up as the other unwinds.

19. The combination, with a moving vehicle, of an electric translating device thereon, a stationary source of current, an intermediate conductor, and a winding-drum for said conductor movable about a vertical axis.

EDWARD M. BENTLEY.

Witnesses:
ROBT. W. BLACKWELL,
JULIEN M. ELLIOT.